US007999729B2

United States Patent
Shaw et al.

(10) Patent No.: US 7,999,729 B2
(45) Date of Patent: Aug. 16, 2011

(54) METHODS AND SYSTEMS FOR LOCATION DETERMINATION VIA MULTI-MODE OPERATION

(75) Inventors: Philip Shaw, Hermosa Beach, CA (US); Thomas R. McKnight, Jr., Ellicott City, MD (US); Rauni Lindross, Baltimore, MD (US); Rudy Yukich, Baltimore, MD (US); Roslyn Honsberger, Catonsville, MD (US)

(73) Assignee: Eikonik, Inc., Elkridge, MD (US)

( * ) Notice: Subject to any disclaimer, the term of this patent is extended or adjusted under 35 U.S.C. 154(b) by 522 days.

(21) Appl. No.: 12/056,709

(22) Filed: Mar. 27, 2008

(65) Prior Publication Data
US 2009/0058720 A1   Mar. 5, 2009

Related U.S. Application Data

(60) Provisional application No. 60/907,289, filed on Mar. 27, 2007.

(51) Int. Cl.
 G01S 19/48 (2010.01)
 G01S 3/02 (2006.01)
 G01S 19/33 (2010.01)
(52) U.S. Cl. .............. 342/357.31; 342/450; 342/357.73
(58) Field of Classification Search ............ 342/357.21, 342/357.72, 357.73, 450, 453, 357.31; 701/207, 701/213
See application file for complete search history.

(56) References Cited

U.S. PATENT DOCUMENTS

2006/0268902 A1*  11/2006  Bonner ..................... 370/401
2007/0153982 A1*  7/2007  Bloebaum et al. ............ 379/33

* cited by examiner

*Primary Examiner* — Dao L Phan
(74) *Attorney, Agent, or Firm* — Sterne, Kessler, Goldstein & Fox P.L.L.C.

(57) ABSTRACT

Provided is a method for facilitating location determination. The method includes granting a subscriber access to a location determination network via a first device and determining location of a second device via the network, the second device being configurable for dual mode location determination. Finally, the determined location of the second device is provided to the first device.

13 Claims, 11 Drawing Sheets

METHODS AND SYSTEMS FOR LOCATION DETERMINATION VIA MULTI-MODE OPERATION

CROSS-REFERENCE TO RELATED APPLICATIONS

This application claims benefit to U.S. Provisional Application No. 60/907,289, filed Mar. 27, 2007, which is incorporated herein by reference in its entirety.

BACKGROUND OF THE INVENTION

1. Field of the Invention

The present invention is related to providing location determination features to subscribers of a location determination system. More particularly, the present invention is related to use, via the location determination system, of a location determining device configured for incorporation in consumer products such as vehicles, pet collars, footwear, mobile telephones, personal digital assistants (PDA), handheld computers, and for other uses as described herein.

2. Related Art

Tracking technology and location determination is an expanding field. Current developments in tracking technology and methodologies are largely based upon handheld tracking devices that use Global Positioning System (GPS) technology. These approaches, however, are limited by inherent limitations of GPS based systems.

For example, GPS systems require a clear sight-to-sky between a hand held device's receiver antenna and at least one orbiting GPS satellite. When this line-of-sight becomes obstructed, for example, by buildings, trees or largely anything that can obstruct sunlight, the reliability of GPS based location determination is significantly decreased.

Another tracking system uses cell triangulation. Although cell triangulation essentially works everywhere a cell phone works and is more robust that GPS, cell phone triangulation is less accurate that GPS.

Another significant limitation of current handheld location determination approaches is the lack of variety of location determination based services available to wireless subscribers. For example, beyond E911 and similar geo-location functions, users have limited ability to use one wireless device to efficiently determine location of another wireless device.

What is needed therefore, are dual-mode location determination approaches that can overcome the aforementioned deficiencies and limitations. What is also needed are location determination devices that can be incorporated into various articles, including consumer products, for the purpose of tracking and/or location determination using cellular triangulation and/or a global positioning system (GPS). Finally, what is needed is a variety of personal location determination services that can be provided to wireless subscribers.

BRIEF SUMMARY OF THE INVENTION

Consistent with the principles of the present invention, as embodied and broadly described herein, the present invention includes a method for facilitating location determination. The method includes granting a subscriber access to a location determination network via a first device and determining location of a second device via the network. The determined location of the second device is provided to the first device.

The present invention is directed to methods and systems for location determination and tracking (e.g., history of locations). Location can be determined, for example, through triangulation with cellular telephone towers and/or by use of GPS. Location and/or tracking information, such as tower locations, is uploaded to a remote device by wireless transmission (e.g., a cellular telephone link or infrared link) and/or by direct connection. Direct connection can include, for example, connection of a data cable between a location determining device and a device, and/or removal of a memory device from a location determination device and insertion of the memory device into another device, such as a computer-based system. Location and/or tracking information can be uploaded continuously, at predetermined times or intervals, and/or upon prompting.

A dual-mode arrangement (e.g., GPS and cellular) for determining location is desirable, especially in cases where the reliability of GPS has been impacted due, for example, to line-of-sight obstructions noted above. A dual-mode arrangement can be optimized to capitalize on the efficiencies of GPS and cell triangulation.

In a dual mode, for example, a handheld wireless device (e.g., a cell phone) can use either a cellular modem to locate its position when GPS is unavailable—or use GPS positioning when it is available.

In the cell triangulation mode, location is traditionally derived through the use of multiple cell towers. More specifically, triangulations are based upon acquiring information from the cell towers in range, transmitting the raw data to servers where location calculations are made, and then sending the location information back to the handheld wireless device. Performing location triangulation external to the handheld device creates inefficiencies and potential bottlenecks in providing location information. In the present invention, however, triangulation can be performed locally, within the hand-held device.

Triangulation with cellular telephone towers typically requires an account with a cellular telephone provider. Thus, where real-time location and/or tracking information is desired, such as with children and pets, and where the information is uploaded through a cellular telephone link, the location determination can be performed with cellular triangulation without incurring additional costs. Cellular location determination is provided for improved location determining availability, when GPS positioning is not available, and/or to periodically provide location information without incurring cellular access costs associated with cellular triangulation.

The location determining methods and systems, of the present invention, can be incorporated into a variety of devices, such as consumer products, including for example, clothing, footwear, pet accessories such as pet collars, cellular telephones, PDAs, and other handheld computers. The methods and systems can also be incorporated into a variety of law enforcement products for attachment to vehicles, hand-carried accessories, and/or persons of interest.

Additional features and advantages of the invention will be set forth in the description that follows, and in part will be apparent from the description, or may be learned by practice of the invention. The advantages of the invention will be realized and attained by the structure and particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

FIG. 1 is an illustration of an example location determining device in accordance with the present invention;

Figure 2A:
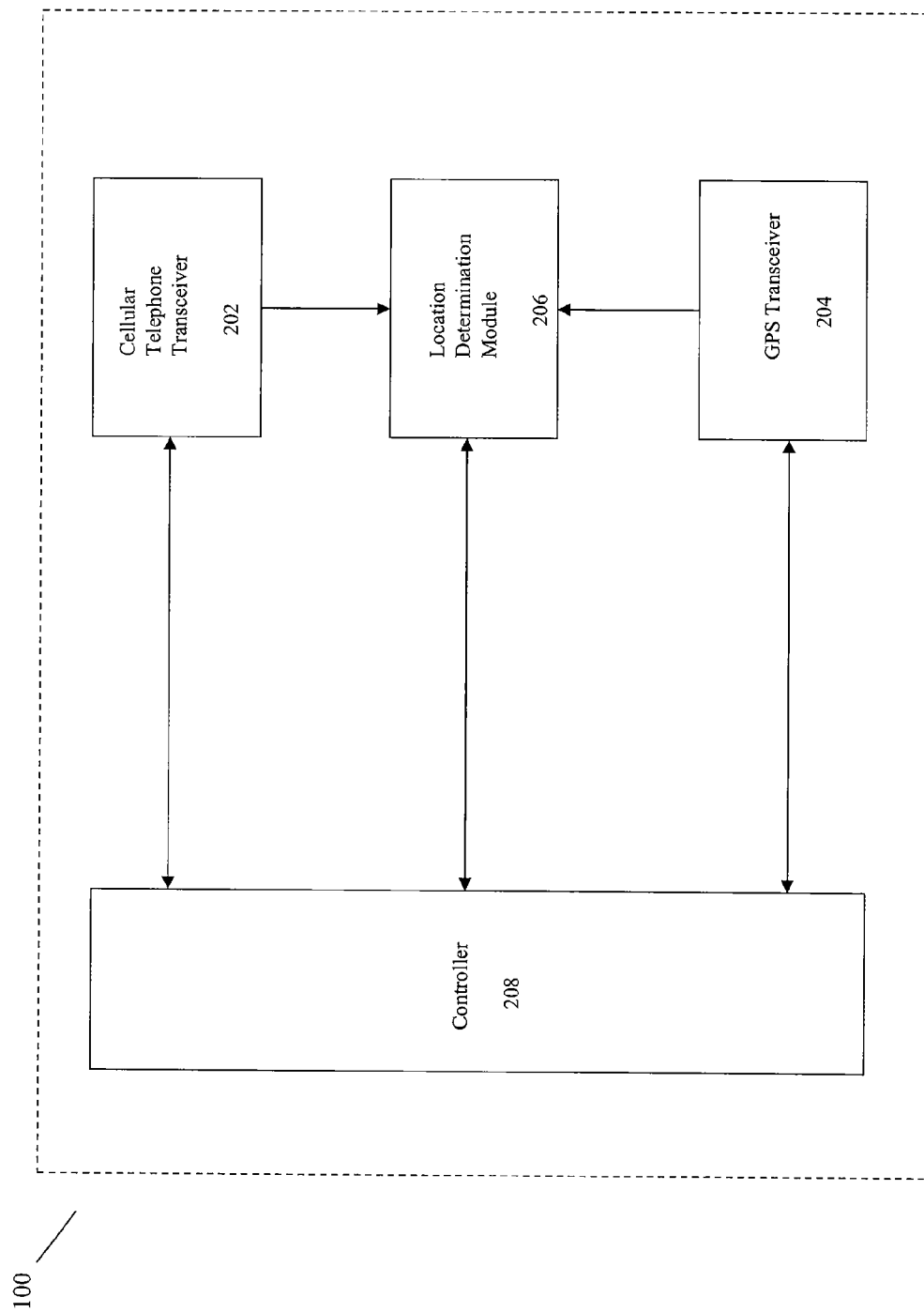
FIG. 2A is a detailed block diagram of the example location determining device of FIG. 1.
Figure 5:
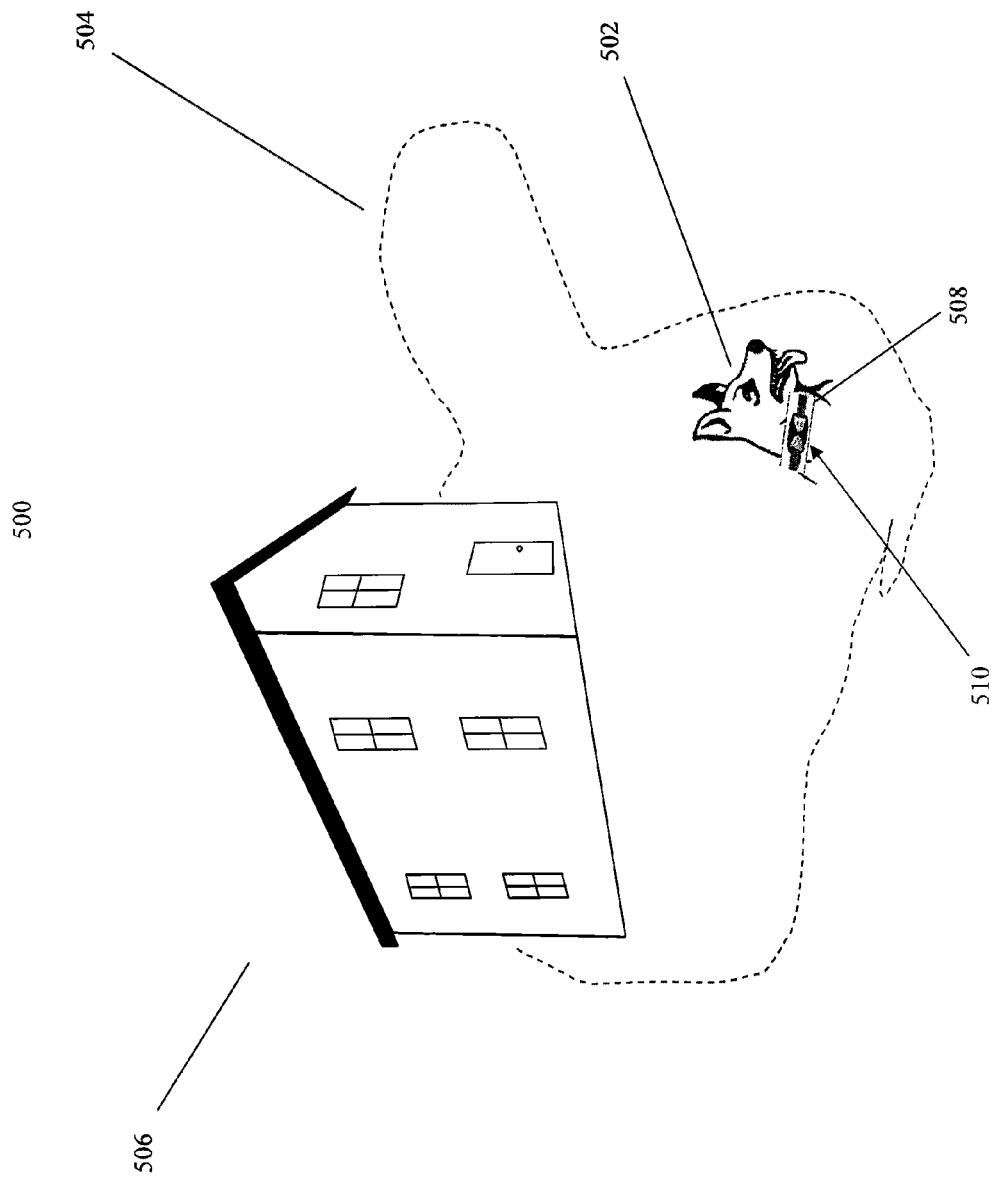
FIG. 5 is another example illustration of the location determining device of FIG. 2A configured for operation in accordance with the first embodiment of the present invention.
Figure 6:
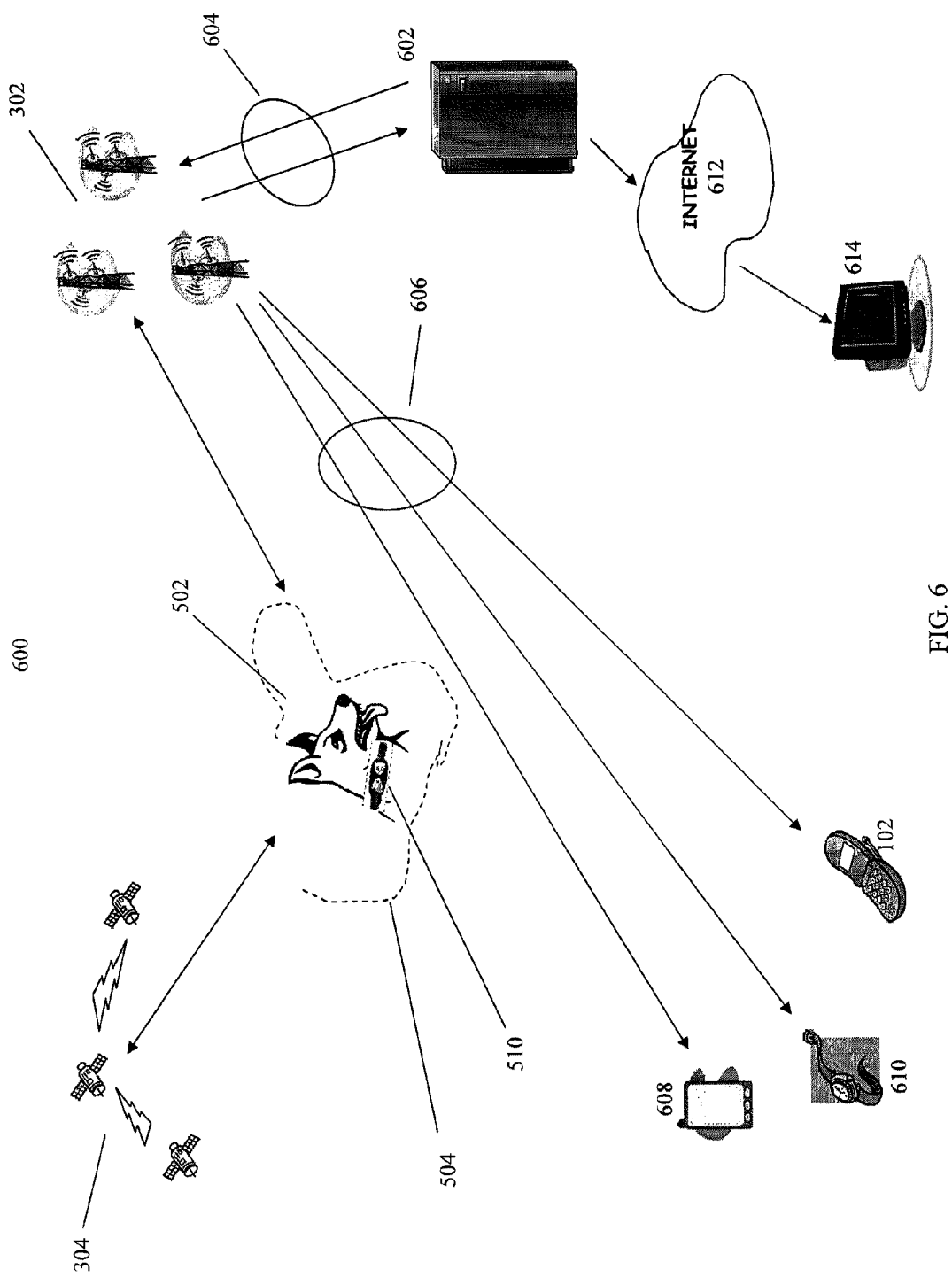
Figure 7:
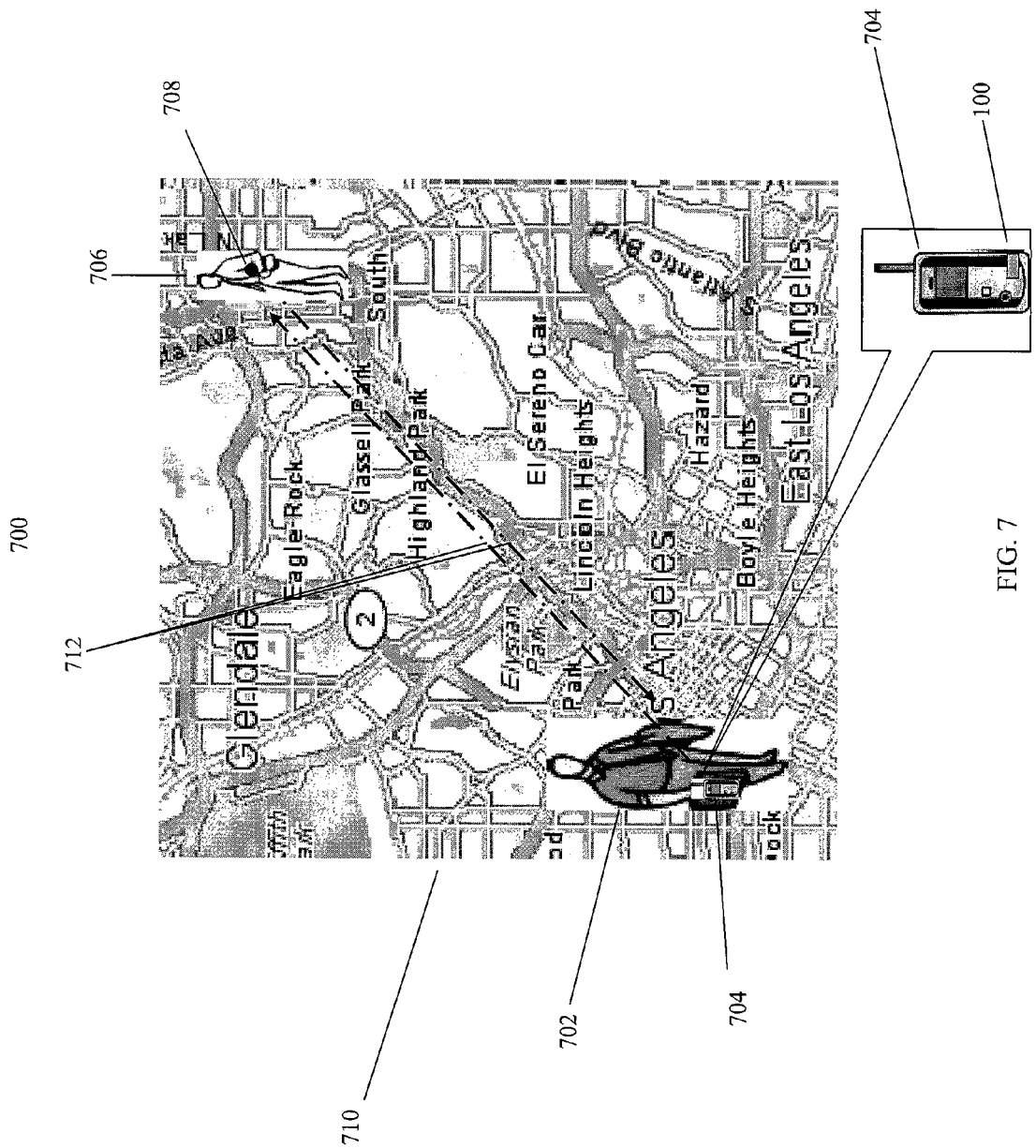
Figure 8:
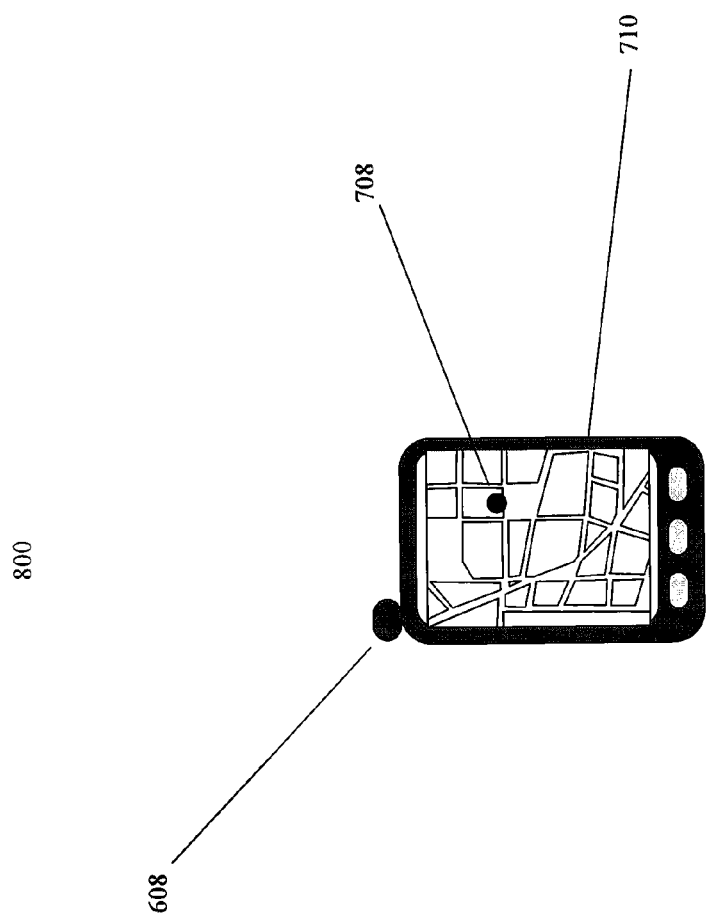
Figure 9:
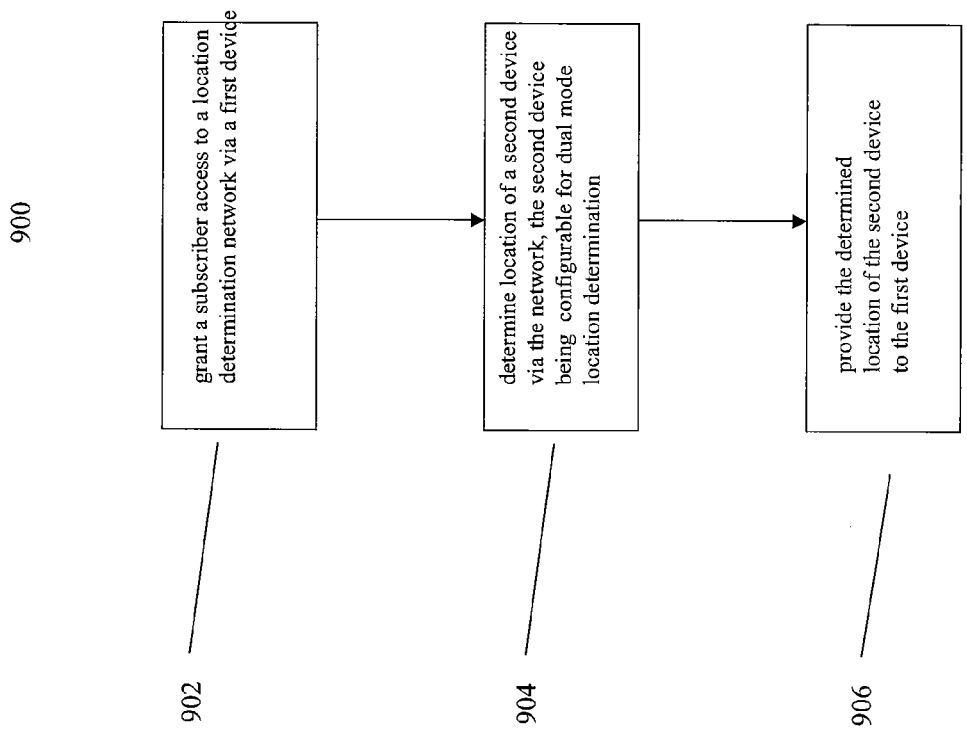
Figure 10:
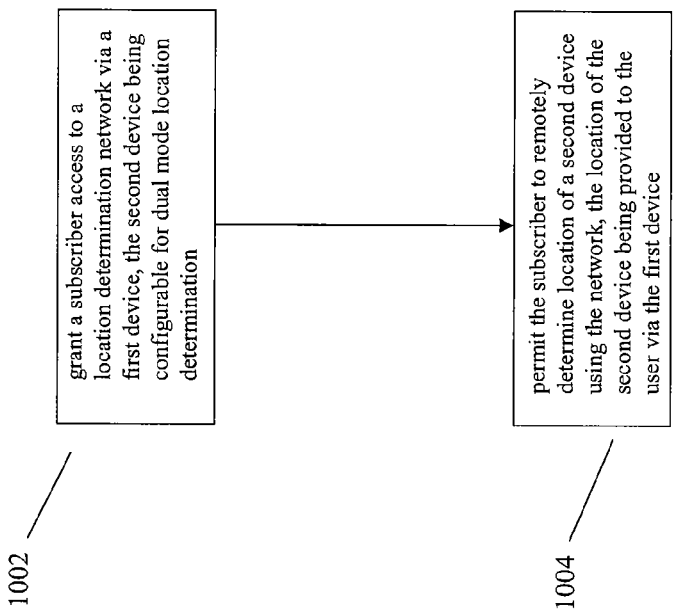

FIG. 6 a more detailed illustration of the second embodiment of the invention shown in FIG. 5;

FIG. 7 is an illustration of the location determining device of FIG. 2A implemented in accordance with a second embodiment of the present invention;

FIG. 8 is an illustration of a remote device configured in accordance with the present invention;

FIG. 9 is a flowchart of an exemplary method of practicing the first embodiment of the present invention; and FIG. 10 is a flowchart of an exemplary method of practicing the second embodiment of the present invention.

DETAILED DESCRIPTION OF THE INVENTION

Table of Contents

| | | |
|---|---|---|
| I. | Overview of the Invention | |
| II. | The Multi-Mode Location Determination Device | |
| | A. | Dual-Mode Switching Operation |
| | B. | Tri-Mode Switching Operation |
| | C. | Quad-Mode Switching Operation |
| III. | Example Subscription Models | |
| | A. | First Geofencing Example |
| | B. | Second Geofencing Example |
| | C. | Example Geofencing operational Scenario |
| | D. | Example End-to-End System Operation |
| | E. | Situational Location Example |
| IV. | Methods of Practicing the Invention | |
| V. | Conclusion | |

I. Overview of the Invention

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appending claims.

It will be apparent to one skilled in the art that the present invention, as described below, may be implemented in many different embodiments. Any actual software code implementing the present invention is not limiting of the present invention. Thus, the operational behavior of the present invention will be described with the understanding that modifications and variations of the embodiments are possible, given the level of detail presented herein.

Figure 1:
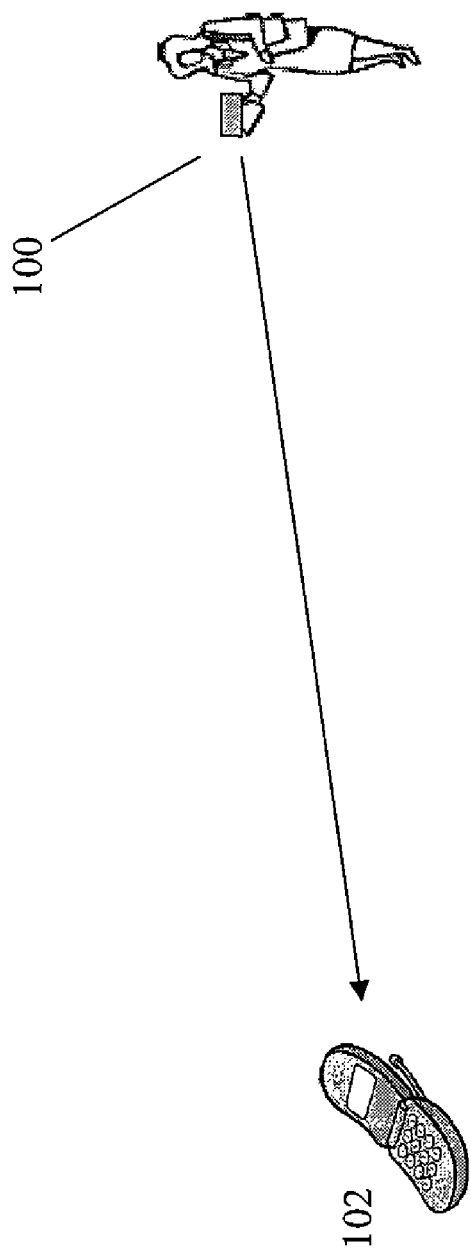

FIG. 1 an illustration of an example location determining device 100 in accordance with the present invention. Although numerous approaches exist to deriving and providing personal location information, the location determining device 100 is configured to facilitate person-to-person location determination. That is, the location determining device 100 can be configured to determine its own location, and then provide its determined location directly to a remote device 102. By way of example, the remote device 102 can be a cell phone, PDA, and/or other similar device.

As discussed in greater detail below, the location determining device 100 is capable of multi-mode switching between, for example, use of GPS and cell tower triangulation to determine location information. This multi-mode switching capability permits the location determining device 100 to provide more robust location determination services than traditional devices.

The location determining device 100, however, is only one component of a unique subscription system that provides subscribers a variety of person-to-person location determination services and features.

II. The Multi-Mode Location Determination Device

A. Dual Mode Switching Operation

FIG. 2A is a detailed block diagram illustration of the example location determining device 100, illustrated in FIG. 1. As shown in FIG. 2A, the personal location determining device 100, includes a controller 208, a cellular telephone transceiver 202, and a location determination module 206. The location determination module 206 includes a cellular triangulation location determination module (not shown). The personal location determining device 100 optionally includes a GPS transceiver 204, and a GPS location determination module within the location determination module 206. Conventional cellular telephone transceiver technology and/or conventional GPS technology can be used. The cellular telephone 202 and the optional GPS transceiver 204 enable a bi-model array switching capability of the device 100. Operation of the personal location determining device 100, will be discussed more fully below.

The present invention, as illustrated in FIG. 2A, provides a system where, for example, GPS location determination can be used when available. When GPS location determination is not available, the location determining device 100 can switch to triangulation location determination. Alternatively, when GPS location determination is unavailable, the location determining device 100 can switch from to triangulation to some other technique, such as Wireless Fidelity (WiFi) or fixed commercial transmitters when GPS is unavailable, if any of the other techniques provide a more accurate location determination.

Figure 3:
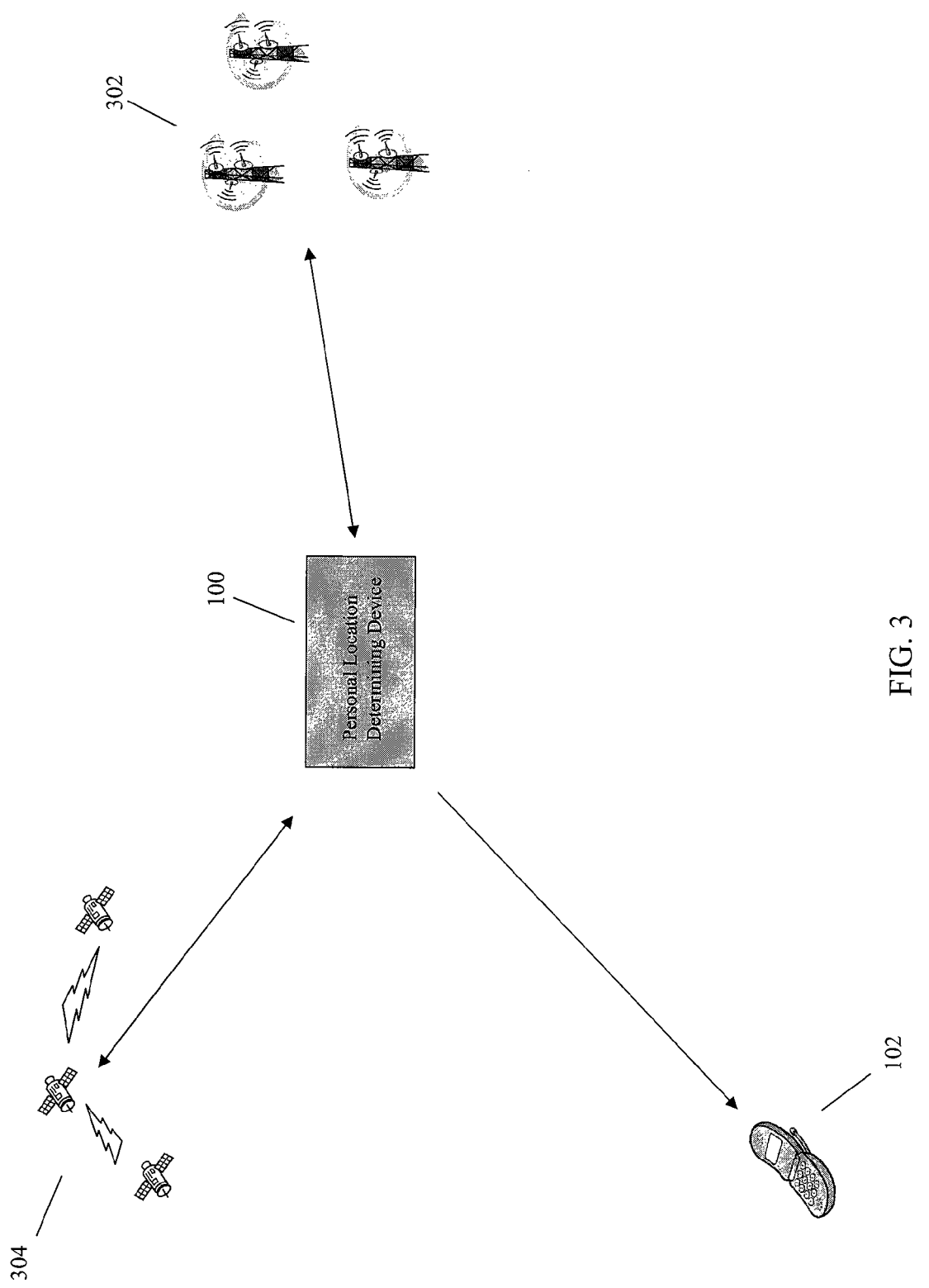
FIG. 3 is an example illustration of the location determining device of FIG. 2A configured in a dual-mode arrangement.

FIG. 3 is an illustration of the example location determining device of FIG. 2A configured as a dual-mode system. In FIG. 3, the personal location determining device 100 determines location through the use of cellular triangulation and/or GPS. As known in the art, cellular triangulation relies on a cellular telephone transceiver that communicates with cellular towers 302 and determines its location by triangulation with the cellular towers 302. GPS relies on a GPS transceiver that receives signals from GPS satellites 304, which allows the GPS transceiver to determine its geographic location. The remote device 102 receives location information and/or tracking information from the location determining device 100. The remote device 102 can include, for example, a computer-based system, a mobile telephone, a PDA, and/or other similar device.

Referring back to FIG. 2A, during operation, the location determination module 206 receives information from the cellular telephone transceiver 202 and/or from the optional GPS transceiver 204. The location determination module 206 determines location information from the received information received from the telephone transceiver 202 and/or from the GPS transceiver 204. The location determination module 206 is configured or programmable to determine location information based on at least cellular triangulation information. The location determination module 206 is optionally configured to determine location information based on cellular triangulation information when available, and from GPS information when cellular triangulation information is not available.

Alternatively, the location determination module 206 can be configured to determine location information from a combination of cellular triangulation information and GPS information. To reduce costs associated with communicating with cellular towers 302 (see e.g., FIG. 3), for example, the location determination module 206 can be configured to determine location information based on cellular triangulation information at some times, and from GPS information at other times.

Where the personal location determining device 100 can be configured for both cellular triangulation location determination and GPS location determination, the controller 208 is configured to switch the location determination module 206 between a cellular triangulation location determination mode and a GPS location determination mode, as appropriate for the configuration. The controller 208 is optionally user-programmable for different triangulation/GPS modes of operation.

The controller 208 is configured to provide or upload the location information, optionally including tracking information, to the remote device 102 (FIG. 1) and/or to a memory device of the personal location determining device 100.

The controller 208 is configurable to upload the location information to the remote device 102 through a transmitter portion of the transceiver 202 and the cellular towers 302. Alternatively, the controller 208 can be configured to upload the location information to a memory device and/or one or more external ports, which can include wire connector ports and/or infrared ports. Wire connector ports can include, for example, telephone ports, internet/Ethernet ports, printer ports, and/or universal serial bus (USB) ports.

The controller 208 can also be configured to upload the location information to a universal resource locator (URL) address of the Internet, using a connector port and/or the cellular transceiver 202.

Where the personal location determining device 100 includes a wire connector port, a wire connector can be coupled between the personal location determining device 100 and the remote device 102, and/or between the personal location determining device 100 and a transmitter that transmits the location information from the personal location determining device 100 to the remote device 102.

Where the personal location determining device 100 includes a wire connector port, a portable memory device, such as a USB memory stick, can be inserted into an appropriate wire connector port for receiving and storing the location information. The portable memory device can then be transferred to the remote device 102 for downloading of the location information.

The controller 208 can be configured to upload location information continuously, at predetermined intervals, and/or upon receipt of a prompt from the remote device 102. The controller 208 can receive prompts or requests for location information from the remote device 102 via the cell towers 302 and the transceiver 202, and/or through an external port. The controller 208 can optionally respond to such queries only after requester verification, which can be based on caller identification information.

The controller 208 can upload location information to a predetermined or programmed telephone number through the transceiver 202, to one or more external ports, and/or to a predetermined or programmed URL.

The personal location determining device 100 optionally includes location history memory configured to store location information so that it can be uploaded at a later time. This can be useful in situations where the personal location determining device 100 is out of range for uploading the location information.

The controller 208 can upload location information in one or more of a variety of formats, such as, without limitation, audio and/or computer readable data. The location information can include, for example, geographical coordinates (e.g., longitude and latitude), and/or a street address.

The controller 208 can also send alerts and/or to upload location information upon a determination that a location determination is outside a programmable boundary, such as, for example, a perimeter of one's property (discussed more fully below). Such a feature is particularly useful in determining if a young child, pet, or individual under house arrest has left his home, or traveled beyond a property boundary.

The remote device 102 optionally includes software in the form of a computer program product including computer readable media having computer program logic recorded thereon that causes a computer system to track the location of one or more personal location devices 100. More particularly, the computer program logic causes the computer system to receive location information uploaded by the controller 208, and to display the location information, such as on a map, and/or to store the location information in a memory device of the computer system. The software can also include alarm logic that causes the computer system to determine whether the received location determination falls outside of a programmable boundary and generate and alert (audio and/or visual), and/or that causes the computer system receive such a determination from the personal location determining device 100 and generate an alert.

The personal location determining device 100, or a portion thereof, is optionally enclosed within a housing configured for, or as, a consumer product and/or to be worn or carried by an individual. For example, the housing can be configured to fit within a pet collar or to attach to a pet collar (discussed in greater detail below). Alternatively, the housing can be configured to fit within in a shoe, including a tongue of the shoe or a cavity formed within the sole of the shoe. The housing can also be configured to attach externally to a shoe of for use with other consumer products including, such as mobile telephones, PDA, handheld computers and vehicles. The housing can also be incorporated into a variety law enforcement products for attachment to vehicles, hand-carried accessories, and/or persons of interest.

In one embodiment, the personal location determining device 100, or a device in which it is incorporated, includes a power-down switch. In this configuration, the controller 208 is configured to maintain power to at least a portion of the personal location determining device 100 (e.g., the controller 208, the cellular telephone transceiver 202, the GPS transceiver 204, and/or the location determination module 206), on at least a limited basis, after the power-down switch is activated. This arrangement prevents an individual from intentionally or accidentally deactivating the personal location determination device such that it is no longer determining or uploading location information.

In some instances, however, it may be necessary for the cellular telephone transceiver 202 and/or other portions of the personal location determining device 100 to be more fully powered down, for example, at an airport. The controller 208 is thus optionally configurable to more fully power-down the cellular telephone transceiver 202 and/or other portions of the personal location determining device 100 when a location determination is within a predetermined boundary or location, such as an airport. The controller 208 can also at least temporarily and partially power-up the cellular telephone transceiver 202 and/or other portions of the personal location determining device 100 at a later time and without deactivation of the power-down switch. The later time can be determined according to an algorithm or a predetermined or programmable period of time.

In dual-mode, the present invention will use both GPS and cell tower triangulation. In this mode, the personal location device 100 attempts to determine a location fix with GPS first. If the Assisted (or non-assisted) GPS location fix is available, the location device 100 will transmit the location coordinates back over the modem. If a GPS fix is not possible (for example because the unit is indoors), it will automatically switch to a cell-triangulation mode to determine location and will report that cell-triangulation is being used. Cell triangulation is completed on the personal location device 100 itself. The GPS transceiver 204 continues to stay on at timed intervals after a location is queried. If the GPS transceiver 204 detects a GPS signal, it will revert out of cell triangulation mode, back to the GPS mode. Under normal circumstances, the GPS mode provides higher location accuracy. Any time the unit switches between modes, it automatically sends a location report.

The dual-mode switching arrangement, discussed above, can be used in combination with a number of wireless systems, such as cellular, WiFi, and Worldwide Interoperability for Microwave Access (WiMax), etc., to report back to a system server. The dual-mode switching location technology can also include reporting back to a server in combination with a wireless system, and use of an Applied Service Provider model where the user pays on an interval or monthly bases to access this information.

Figure 2B:
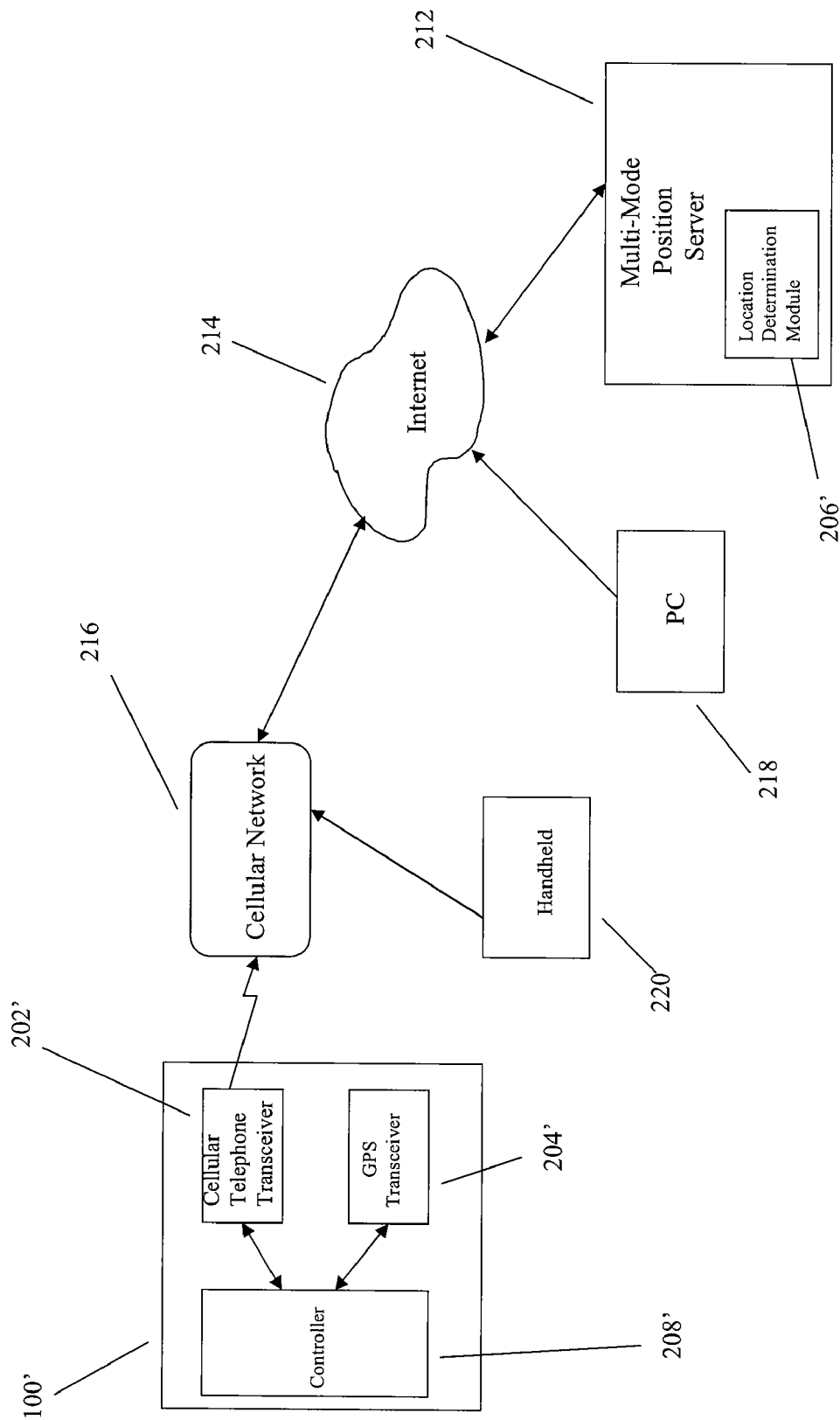
FIG. 2B is an illustration of an alternative configuration of the location determining device shown in FIG. 2A.

FIG. 2B is an illustration 210 of an alternative configuration of the location determining 100 device, shown in FIG. 2A. In FIG. 2B, and in a manner similar to the illustration of FIG. 2A, a location determining device 100' includes a cellular telephone transceiver 202', a GPS transceiver 204', and a controller 208'. In FIG. 2B, however, a location determination module 206' is located within a multi-mode position sever 212. In FIG. 2B, therefore, cellular triangulation as well as final position determination, occurs outside of the determining device 100'.

By way of example, in FIG. 2B, the cellular triangulation and final position determination information is provided to the location determining device 100' via the Internet 214 and via a cellular network 216. The Internet 214 can also provide information to a personal computer (PC) 218 connected thereto, through either a wireless or wired connection. The cellular network 216 can provide information to a handheld device 220, such as a cellular phone.

B. Tri-Mode Switching Operation

The present invention can also be configured to operate in conjunction with tri-mode switching location technology. In tri-mode operation, the location determination device 100 is able to derive its location information through at least three possible sources: GPS, cellular triangulation, and WiFi, or any radio transmission (i.e., beacon technology).

C. Quad-Mode Switching Operation Further still, the present invention can be used in a quad-mode switching arrangement. By using quad-mode location technology, the location determination device 100 can derive its location information through at least four possible sources: GPS, cellular triangulation, WiFi, and WiMax.

III. Example Subscription Models

A. First Geofencing Example

Figure 4:
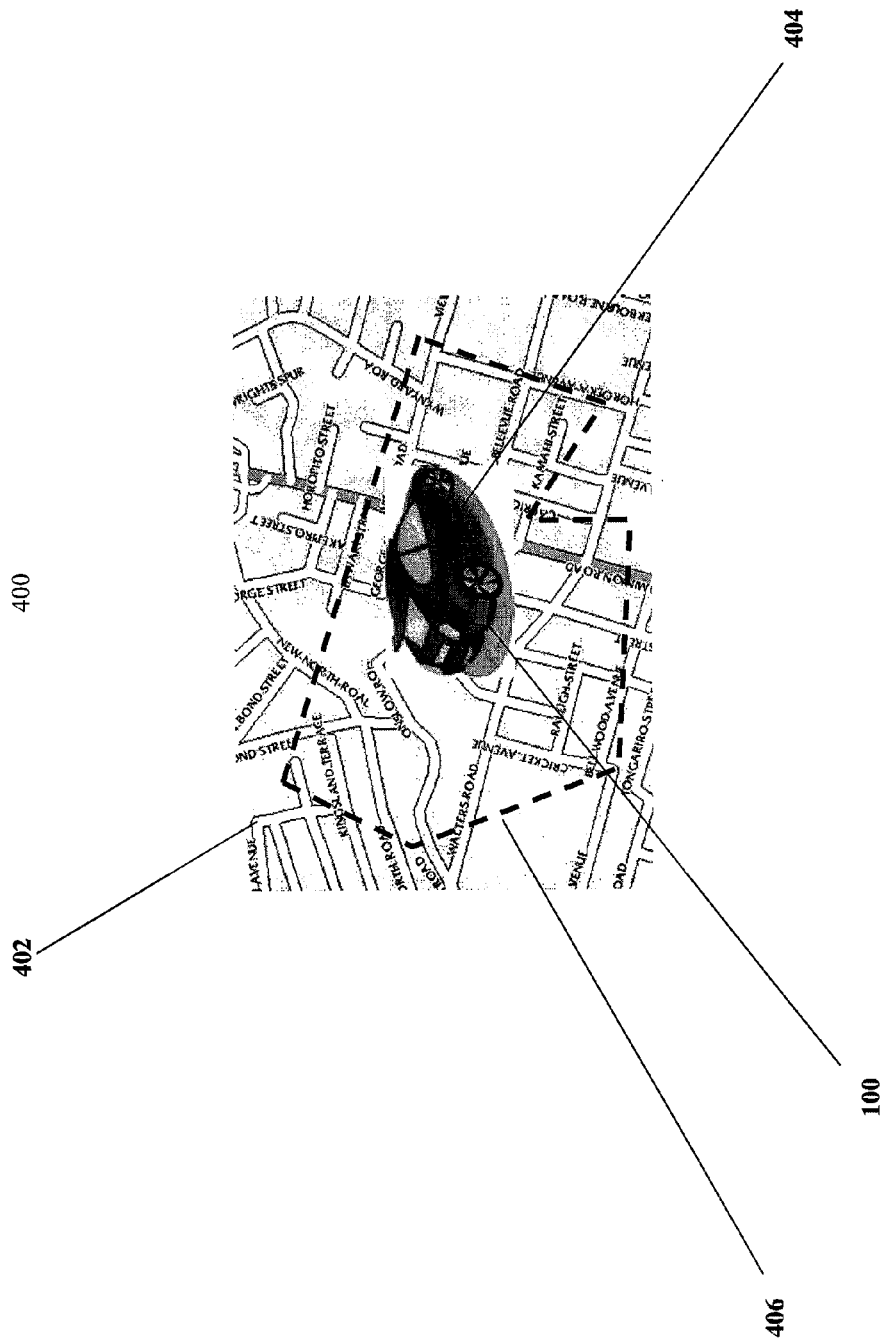
FIG. 4 is an example illustration of the location determining device of FIG. 2A configured for operation in accordance with a first embodiment of the present invention.

FIG. 4 is an illustration 400 of the location determining device 100 operating in accordance with a first embodiment of the present invention. More particularly, FIG. 4 is an illustration of one example of the unique services available to a subscriber of a network system using the personal location determining device 100. By way of example, such a network can be comprised of existing the infrastructure associated with cellular phones, GPS, and/or mapping services.

In the illustration 400 if FIG. 4, the location determining device 100 can be used to provide real-time tracking of important possessions. In FIG. 4, the device 100 relies on dual-mode GPS and cellular triangulation tracks where GPS alone is inadequate, such as many malls, buildings and garages.

In FIG. 4, for example, a subscriber to location determination services can use existing digital mapping services to specify a geographic region 402 of interest. In particular, a subscriber can define this region using any arbitrary polygon. Existing systems that accomplish this function require the user to specify a center point and a radius. The present invention does away with this restriction, and allows the subscriber to define any arbitrary shape defined by straight line edges. The system subscriber (e.g., a parent) and owner of a vehicle 404 can select a specific address or boundary 406 for which they have restricted a user of the vehicle 404 to cross. As shown in FIG. 4, the vehicle 404 is equipped with the personal location determining device 100. In the example of FIG. 4, the location determining device 100 can be used to notify the subscriber whenever the vehicle 404 crosses the boundary 406. Similarly, the subscriber can also be notified when the vehicle 404 arrives at a specific address. Operation of the location determining device 100, in the example of FIG. 4, will be discussed more fully below.

B. Second Geofencing Example

FIG. 5 is another example illustration 500 of the location determining device 100 configured to operate in accordance with the present invention. In the illustration 500, a pet owner may have concern with the location of a pet 502. For example, although the pet 502 does not typically venture beyond a geographic boundary 504 of the owner's property 506, the owner may desire to be notified if and when the pet 502 crosses the boundary 504. In the illustration 500, the pet 502 wears a pet finder device 508, equipped with a specifically configured location determining device 510. Here, the owner can receive notification forwarded to a remote device, such as a cell phone, whenever the pet 502 crosses the boundary 504. This process is explained more fully with reference to FIG. 6.

C. Example Geofencing Operational Scenario

FIG. 6 a more detailed illustration 600 showing exemplary operation and use of the location determining device 100 in accordance with the illustrations of FIGS. 5 and 6. As shown in FIG. 6, as the pet 502 crosses the property boundary 504, the location device 100 determines a current location of the device 100. As discussed above, this determination can be derived, by way of example, through triangulation using the cell towers 302. On the other hand, the location determination device 100 can derive its location based upon the GPS satellites 304. Alternatively, the location determination device 100 can derive its location based upon a combination of the cell towers 302 and the GPS satellites 304. This determination can be based upon periodic location determination performed in accordance with a subscriber selectable timing scheme.

In FIG. 6, the subscriber's location determination criteria can be specified and input to a network system controlled by a cellular or location determination service provider. For example, the service provider can enter the subscriber's location determination criteria as data to a server 602, associated with the network system. The actual geographic location of the pet 502 can be forwarded to the server 602 along data path 604. Date representative of the actual location of the pet 502 will be compared with the subscriber's location determination criteria. When the comparison indicates that the pet 502 has crossed the boundary 504, a notification will be forwarded to the subscriber using a variety of mechanisms.

For example, the subscriber can choose to be notified via wireless device, wired device, or by email. If the subscriber chooses wireless notification, the server 602 forwards notification, by way of the cellular towers 302 and a wireless data path 606, to the subscriber via the cell phone 102, a PDA device 608, or a watch device 610. The watch device 610 can be equipped with a unique graphical user interface to provide suitable audio and/or video notification to the subscriber in accordance with the illustration 600.

Alternatively, or in combination therewith, the subscriber can choose to receive e-mail notification. If the subscriber has chosen email notification, when the pet 502 crosses the geographic boundary 504, an email will be forwarded from the server 602, via the Internet 612, to a subscriber's computer terminal 614. In this alternative arrangement, the arrangement 600 of FIG. 6 provides a user-friendly web-based approach for map and satellite tracking of a subscriber's possessions. This feature is also perfectly suitable for motorcycles, bikes, luggage, kid's backpacks, golf clubs, and more.

D. Example End-to-End System Operation

In the present invention, referring back to FIGS. 2B and 3 for example, the location determining device 100' can query the GPS transceiver 204' for a position (e.g., on a scheduled basis, or in response to a remote request from the cellular network). If the mobile device 100' is able to obtain a GPS position from the GPS transceiver, it forwards that position to the multi-mode position server 212. If the mobile device 100' is unable to obtain a GPS position from the GPS transceiver 204', it relays this fact to the position server 212. Alternatively, WiFi or information from fixed radio transmitters such as commercial broadcast radio and television stations can be used to relay or provide information related to GPS position determination.

Also relayed to the position server 212 is any other information that the mobile device 100' can obtain, or deduce from the cellular network 216, which can be used to provide a cellular based position of the mobile device 100'. This information includes, but is not limited to, the identification of the cell towers 302 that are visible, and tower signal strength. The multi-mode position server 212 then determines a position estimate for the location determining device 100'. As noted above, alternatively, the position determination can be performed on the location determining device 100' itself.

By way of example, the estimate for the location determining device 100' can be determined in the following manner:

A. If GPS position is provided from the mobile device, then this position is used as the position estimate.

B. If GPS position is reported as unavailable from the mobile device, the position server then computes a position estimate on the basis of measured parameters of the cellular network as seen from the mobile device.

C. This position server estimate is then forwarded to a user, upon request, or on a schedule, either to a device attached to the internet, or another mobile display. This can either be through the use of a web page, or a directed message.

E. Situational Location Example

FIG. 7 is an illustration 700 of the location determining device 100 operating as an inexpensive personal tracking system. More specifically, in the illustration 700, two devices can be used to determine the distance between them. In one example, a user 702 can use a remote device 704 (e.g., a cell phone) equipped with the remote device 100, to pinpoint the location of another user 706. In this example, the user 706 has a 'pingable' device 708, such as Eikonik's TommyBox™ tracking system. Using the remote device 704, along with the location determining device 100, the user 702 can ping the device 708 to determine a distance between it and the remote device 704.

Since the remote device 704 knows its own location, provided by the location determination device 100, when supplied the a relative distance between the remote device 704 and the device 708, the location device 704 can also determine the location of the device 708 within a location grid 710. For example, using geospatial mapping, the remote device 704 can determine the location of the device 708 by wirelessly pinging the device 708 along a data path 712.

FIG. 8 is an illustration 800 of the PDA 608 configured in accordance with the embodiment shown in FIG. 7. In FIG. 8, the PDA 608 can be configured to display the grid 710, pinpointing the precise location of the device 708 as determined using the pinging process discussed above with reference to FIG. 7. The PDA 608 provides a simplified visualization platform using standard resolution and digital map zoom functionality.

IV. Methods of Practicing the Invention

FIG. 9 is a flowchart of an exemplary method 900 of practicing a first embodiment of the present invention. In the method 900, a subscriber is granted access to a location determination network via a first device in step 902. In step 904, the location of a second device is determined via the network, the second device being configurable for dual mode location determination. In step 906, the determined location of the second device is provided to the first device.

FIG. 10 is a flowchart of an exemplary method 1000 of practicing a second embodiment of the present invention. In the method 1000, a subscriber is granted access to a location determination network via a first device, as indicated in step 1002. The first device is configurable for dual mode location determination. In step 1004, the subscriber is permitted to remotely determine location of a second device using the network, the location of the second device being provided to the user via the first device.

V. Conclusion

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for facilitating location determination, comprising:
   granting a subscriber access to a location determination network via a first device;
   determining location of a second device via the network, the second device being configurable for dual mode location determination; and
   providing the determined location of the second device to the first device.

2. The method of claim 1, wherein the determining occurs within the second device.

3. The method of claim 1, wherein a first of the dual modes includes a satellite constellation based component and a second of the dual modes includes a cellular network tower based component; and
   wherein the second of the dual modes is activated when the first of the dual modes is unavailable.

4. The method of claim 3, wherein the determined location is provided as an update to an Internet web page.

5. The method of claim 1, wherein the first and second devices are remote to one another.

6. An apparatus for facilitating location determination, comprising:
   means for granting a subscriber access to a location determination network via a first device;
   means for determining location of a second device via the network, the second device being configurable for dual mode location determination; and
   means for providing the determined location of the second device to the first device.

7. The apparatus of claim 6, wherein the determining occurs within the second device.

8. The apparatus of claim 6, wherein one of the dual modes is based upon a satellite constellation and another of the dual modes is based upon cellular network towers.

9. A method for facilitating location determination, comprising:
   granting a subscriber access to a location determination network via a first device, the first device being configurable for dual mode location determination; and
   permitting the subscriber to remotely determine location of a second device using the network, the location of the second device being provided to the subscriber via the first device.

10. The method of claim 9, wherein the determining occurs within the second device.

11. The method of claim 9, wherein one of the dual modes is based upon a satellite constellation and another of the dual modes is based upon cellular network towers.

12. The method of claim 11, wherein the cellular network towers are used to perform triangulation.

13. A method for facilitating location determination, comprising:
   granting a subscriber access to a location determination network via a first device;
   providing the subscriber a capability to determine location of a second device via the network, the second device being configurable for dual mode location determination; and
   facilitating providing the determined location of the second device to the first device.

* * * * *